United States Patent
Kim et al.

(10) Patent No.: US 10,497,261 B2
(45) Date of Patent: Dec. 3, 2019

(54) TRAFFIC BLOCKING AVOIDANCE SYSTEM FOR AN AUTOMATED VEHICLE

(71) Applicant: Aptiv Technologies Limited, St. Michael (BB)

(72) Inventors: Junsung Kim, Pittsburgh, PA (US); Jong Ho Lee, Pittsburgh, PA (US)

(73) Assignee: Aptiv Technologies Limited, St. Michael (BB)

( * ) Notice: Subject to any disclaimer, the term of this patent is extended or adjusted under 35 U.S.C. 154(b) by 136 days.

(21) Appl. No.: 15/669,189

(22) Filed: Aug. 4, 2017

(65) Prior Publication Data
US 2019/0043353 A1    Feb. 7, 2019

(51) Int. Cl.
*G08G 1/0967*    (2006.01)
*G05D 1/00*    (2006.01)
(Continued)

(52) U.S. Cl.
CPC ... *G08G 1/096725* (2013.01); *B60W 30/0956* (2013.01); *G05D 1/0088* (2013.01); *G05D 1/0248* (2013.01); *G05D 1/0257* (2013.01); *G05D 1/0274* (2013.01); *G05D 1/0278* (2013.01); *G05D 1/0289* (2013.01); *G08G 1/0133* (2013.01); *G08G 1/0145* (2013.01); *G08G 1/04* (2013.01); *G08G 1/056* (2013.01); *G08G 1/09675* (2013.01); *G08G 1/096716* (2013.01); *G08G 1/096775* (2013.01); *G08G 1/096783* (2013.01); *G08G 1/162* (2013.01);
(Continued)

(58) Field of Classification Search
CPC ............ B60W 30/0956; G05D 1/0289; G05D 1/0088; G05D 1/0274; G05D 1/0257; G05D 1/0248; G08G 1/096783; G08G 1/166; G08G 1/04; G08G 1/056; G08G 1/0133; G08G 1/0145; G01S 19/14
See application file for complete search history.

(56) References Cited

U.S. PATENT DOCUMENTS 9,558,659 B1 * 1/2017 Silver .................. G08G 1/0125
9,633,560 B1 * 4/2017 Gao ...................... G08G 1/0145
(Continued)

FOREIGN PATENT DOCUMENTS

WO    WO2017038173    3/2017

OTHER PUBLICATIONS

Florentine et al., "Pedestrian notification methods in autonomous vehicles for multi-class mobility-on-demand service." Proceedings of the Fourth International Conference on Human Agent Interaction, Oct. 4, 2017, pp. 387-392.
(Continued)

*Primary Examiner* — Mussa A Shaawat
(74) *Attorney, Agent, or Firm* — Fish & Richardson P.C.

(57) ABSTRACT

A system for semi-autonomous or autonomous operation of a host vehicle includes an intersection location data, at least one detector, and a controller. The intersection location data is associated with a roadway intersection. The at least one detector is configured to output a vehicle signal indicative of a location of a leading vehicle. The controller is configured to receive the vehicle signal and associate the vehicle signal relative to the intersection location data to prevent the host vehicle from entering the roadway intersection until the leading vehicle has at least traveled beyond the roadway intersection.

19 Claims, 4 Drawing Sheets

(51) Int. Cl.
    *G08G 1/01*     (2006.01)
    *G05D 1/02*     (2006.01)
    *G08G 1/04*     (2006.01)
    *G08G 1/056*     (2006.01)
    *B60W 30/095*     (2012.01)
    *G08G 1/16*     (2006.01)
    *G01S 19/14*     (2010.01)

(52) U.S. Cl.
    CPC .............. *G08G 1/166* (2013.01); *G01S 19/14* (2013.01); *G05D 2201/0213* (2013.01)

(56) References Cited

U.S. PATENT DOCUMENTS

| | | | |
|---|---|---|---|
| 9,868,391 B1* | 1/2018 | Fairfield | B60Q 5/005 |
| 10,019,011 B1* | 7/2018 | Green | B60W 30/0956 |
| 2015/0329111 A1* | 11/2015 | Prokhorov | B60W 10/18 |
| | | | 701/41 |
| 2017/0329337 A1* | 11/2017 | Kusano | G08G 1/0965 |
| 2018/0101172 A1* | 4/2018 | Min | G01C 21/32 |
| 2018/0173237 A1* | 6/2018 | Reiley | G05D 1/0214 |
| 2018/0247538 A1* | 8/2018 | Baek | B60W 30/09 |
| 2019/0137290 A1* | 5/2019 | Levy | G05D 1/0214 |

OTHER PUBLICATIONS

Pendleton et al., "Autonomous golf cars for public trial of mobility-on-demand service." Intelligent Robots and Systems (IROS), 2015 IEEE/RSJ International Conference on Sep. 28, 2018, pp. 1164-1171.

European Extended Search Report in European Application No. 18187610.3, dated Jan. 23, 2019, 8 pages.

* cited by examiner

TRAFFIC BLOCKING AVOIDANCE SYSTEM FOR AN AUTOMATED VEHICLE

BACKGROUND

The present disclosure relates to automated vehicles, and more particularly, to a traffic blocking avoidance system of the automated vehicle.

The operation of modern vehicles is becoming increasingly autonomous, causing a decrease in driver intervention. A control feature of such modern vehicles may assist the vehicle in navigating through intersections that may be controlled via traffic lights providing intermittent right-of-ways and yield directives. Unfortunately, automated vehicles may not be able to predict the dynamics of leading vehicles within the intersection. This inability to predict the duration that a leading vehicle may be within an intersection, may cause the host vehicle to unintentionally block traffic if the host vehicle is still within the intersection when the right-of-way changes via the traffic lights.

SUMMARY

In one, non-limiting, exemplary embodiment of the present disclosure, a system for semi-autonomous or autonomous operation of a host vehicle includes intersection location data, at least one detector, and a controller. The intersection location data is associated with a roadway intersection. The at least one detector is configured to output a vehicle signal indicative of a location of a leading vehicle. The controller is configured to receive the vehicle signal and associate the vehicle signal relative to the intersection location data to prevent the host vehicle from entering the roadway intersection until the leading vehicle has at least traveled beyond the roadway intersection.

In another, non-limiting, embodiment, an automated vehicle includes a traffic blocking avoidance system and a control unit. The traffic blocking avoidance system includes an object detection device and a controller. The object detection device is configured to detect a leading vehicle and monitor a distance measured between the leading vehicle and the automated vehicle, and output a signal indicative of the distance. The controller is configured to recognize an intersection, locate the intersection with respect to the automated vehicle, receive the signal, compare the distance to a threshold distance, output a first command signal if the distance is less than the threshold distance, and output a second command signal if the distance is greater than the threshold distance. The control unit is adapted to receive the first command signal thereby preventing the automated vehicle from entering the intersection, and receive the second command signal thereby causing the automated vehicle to enter the intersection.

In another, non-limiting, embodiment, a computer software product is executed by a processor and is stored in an electronic storage medium of a host vehicle. The product is configured to prevent the host vehicle from blocking traffic when entering a roadway intersection, and includes an object monitoring module, a location module, and a determination module. The object monitoring module is configured to receive a signal from an object detection device of the host vehicle to determine a distance between a leading vehicle and the host vehicle. The location module is configured to determine a location of the roadway intersection relative to the host vehicle. The determination module is configured to prevent the host vehicle from entering the roadway intersection if the leading vehicle has not cleared the roadway intersection.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
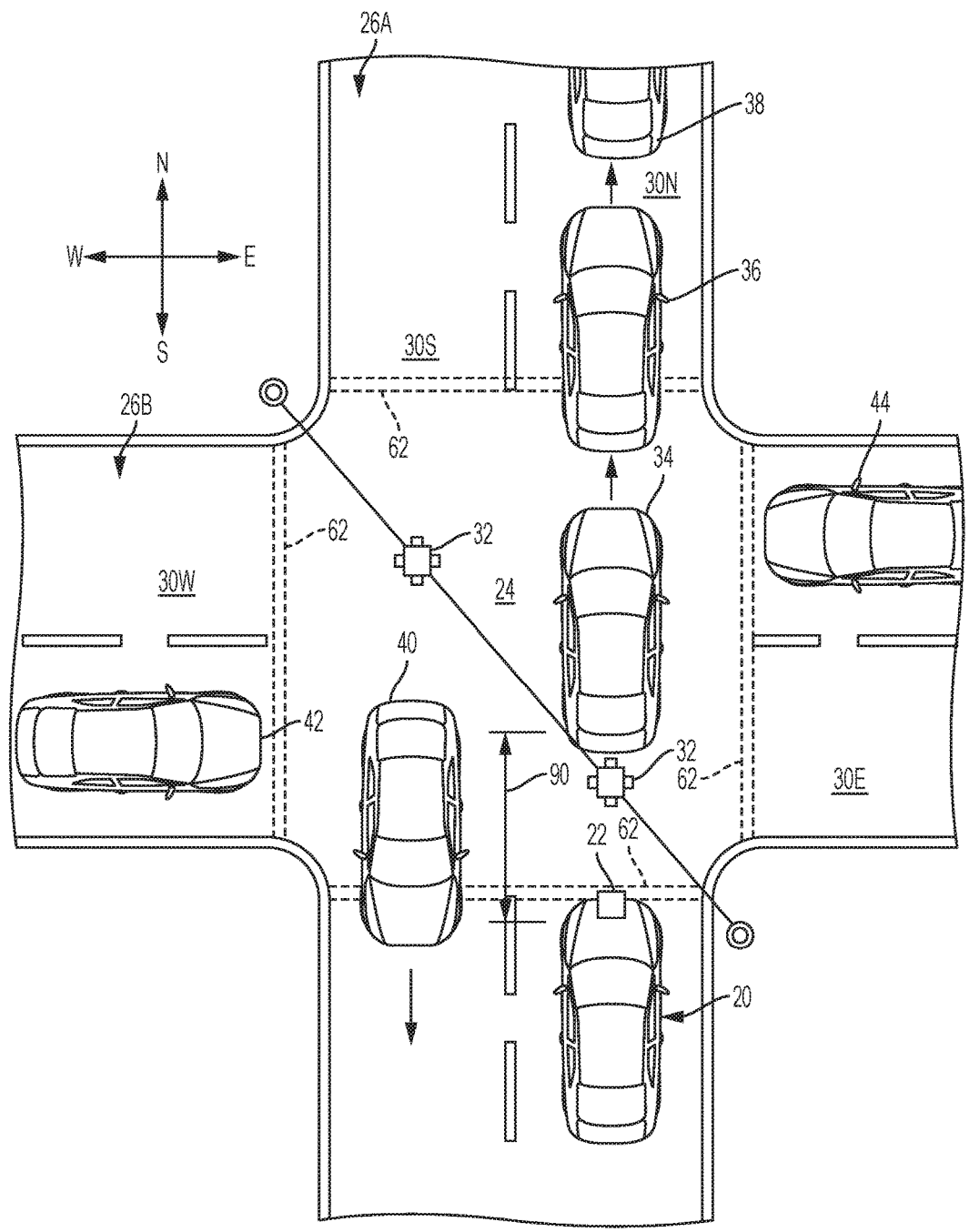
FIG. 1 is a top view of a roadway intersection traveled by an automated vehicle having the right-of-way, in a stopped condition, and equipped with a traffic blocking avoidance system in accordance with the present invention.

FIG. 1 illustrates a non-limiting example of a host vehicle 20 that includes a traffic blocking avoidance system 22 operated in an intersection 24 that may be a roadway intersection. The host vehicle 20 may be an automated vehicle that includes semi-autonomous operation and autonomous (i.e., fully automated) operation. As part of a fully automated vehicle, the system 22 may control the speed, direction (e.g., steering), brakes, and other aspects of the operation of the host vehicle 20 necessary for the host vehicle 20 to travel in various lanes of intersecting roadways 26A, 26B, and maneuver through the intersection 24, without interaction from an occupant, or operator 28 (see FIG. 4) situated within the host vehicle 20.

For simplicity of explanation, the roadways 26A, 26B and intersection 24 will be described with respect to North, South, West, and East coordinates as one non-limiting example. The roadway 26A includes North (N) and South (S) bound lanes 30N, 30S, and the roadway 26B includes West (W) and East (E) bound lanes 30W, 30E. The intersection 24 is generally formed by the crossing, or intersection, of lanes 30N, 30S with lanes 30W, 30E. An intersection traffic control device 32 (e.g., traffic lights) may be generally located at the intersection 24 to direct traffic through the intersection. That is, the intersection traffic control device 32 functions to intermittently provide a vehicle right-of-way (i.e., permission to go) to traffic in the lanes 28W, 28E while yielding traffic (i.e., demand to stop) traffic in the lanes 28N, 28S, and vice-versa. In one example, the right-of-way may be provided by a traffic light that illuminates "green"; and, the stopping, or holding, of traffic is performed by illuminating a "red" light. It is contemplated and understood that other means of stopping and resuming traffic flow through an intersection may apply.

Figure 2:
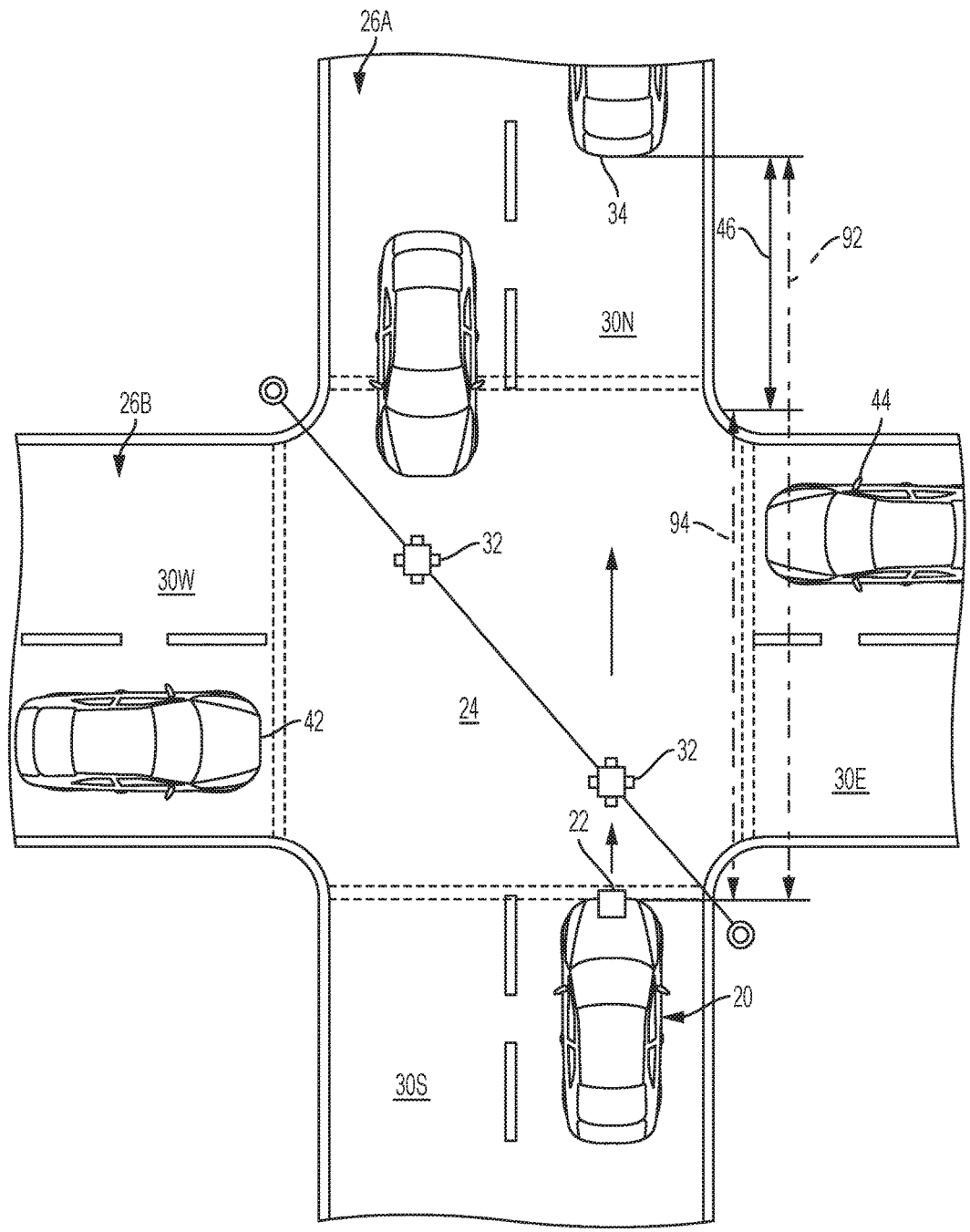
FIG. 2 is a top view of the roadway intersection with the automated vehicle having the right-of-way, intending to move straight through the intersection, and having the necessary clearance to begin moving through the intersection.

As illustrated in FIGS. 1 and 2, the lanes 30N, 30S initially have the right-of-way and the lanes 30W, 30E do not. Various vehicles are illustrated in various lanes. In FIG. 1, the intent of the host vehicle 20 is to travel North-bound and is located in lane 30N. Vehicles 34, 36, 38 may be traveling North bound, may be leading the host vehicle 20, and are in lane 30N. An on-coming vehicle 40 may be traveling South-bound and is located in lane 30S. Vehicles 42, 44 in respective lanes 30E, 30W of roadway 26B have yielded to traffic on roadway 26A via the traffic light 32.

Although the North bound lane 30N has the right-of-way for a period of time, the system 22 of the host vehicle 20 generally functions to prevent the host vehicle from entering the intersection 24 until the leading vehicle (e.g., vehicle 34) has at least cleared the intersection 24. Therefore, if the intent of the host vehicle 20 is to travel straight and through the intersection 24, the host vehicle, as depicted in FIG. 1, may not be moving because the leading vehicle 34 has yet to clear the intersection 24.

Referring to FIG. 2, once the leading vehicle 34 has cleared the intersection by, for example, a distance (see arrow 46) that may be about equal to the length of the host vehicle 20, the system 22 may permit the host vehicle 20 to enter the intersection 24. In this way, the traffic blocking avoidance system 22 may prevent the potential occurrence that one of the leading vehicle 34, 36, 38 should stop for a prolonged period of time causing the host vehicle 20 to be stranded in the intersection 24 while the traffic lights 32 change the 'right-of-way' permission to the roadway 26B. If the host vehicle 20 is stranded in this way, the host vehicle may cause prevent, or block, the right-of-way travel of vehicles 42, 44 through the intersection 24.

Figure 3:
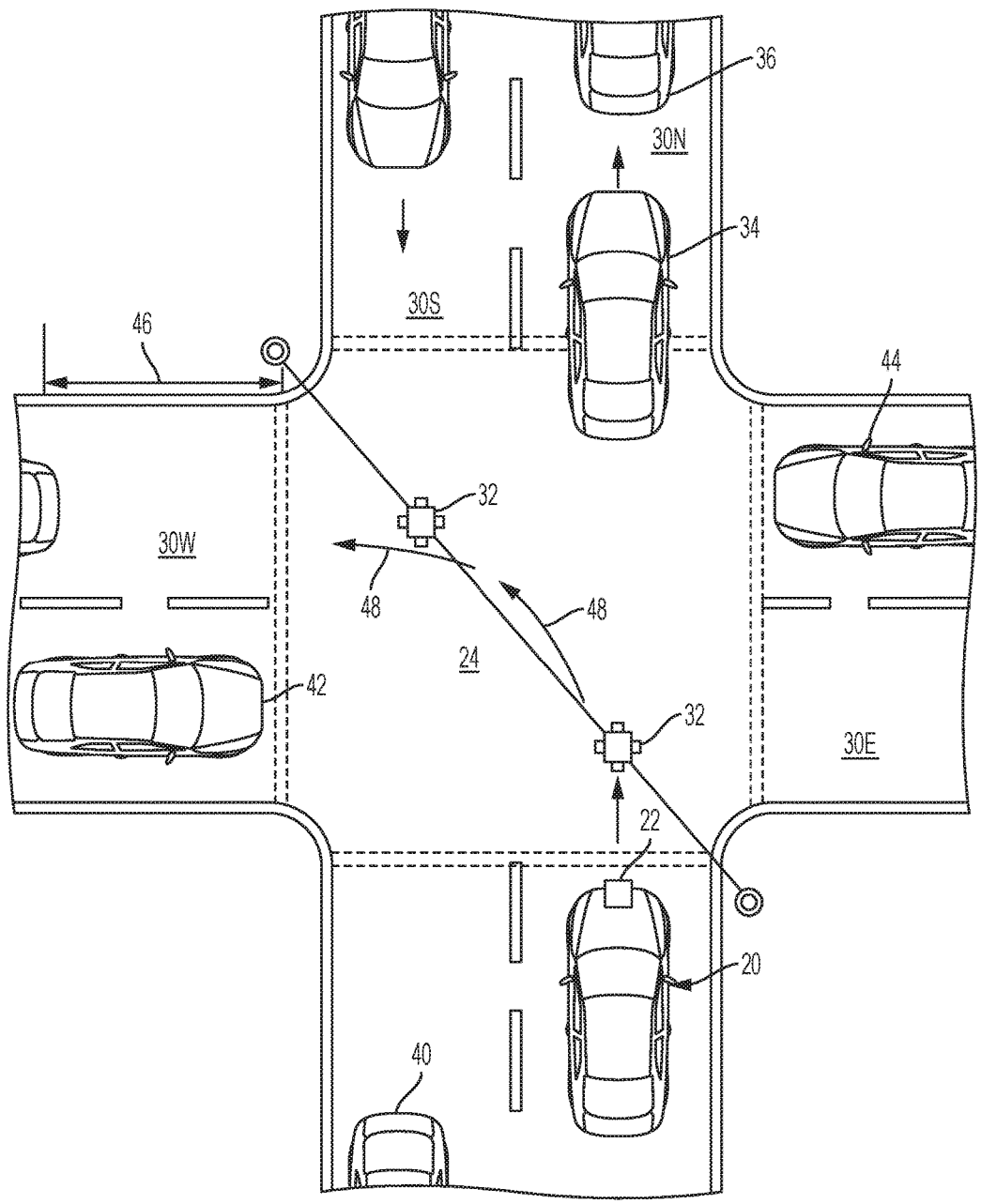
FIG. 3 is a top view of the roadway intersection with the automated vehicle having the right-of-way, intending to turn right through the intersection, and having the necessary clearance to begin moving through the intersection.

Referring to FIG. 3, the traffic blocking avoidance system 22 may also apply to scenarios where the intent of the host vehicle 20 is to turn (see arrows 48) through the intersection 24. More specifically, the intent of the host vehicle 20 is to enter the West bound lane 30W from the North bound lane 30N. In this scenario, and although the host vehicle 20 may have the right-of-way to enter the intersection 24, the system 22 may prevent the host vehicle 20 from entering the intersection 24 until lane 30W is clear by the distance 46 from the intersection 24. When lane 30W is cleared, the host vehicle 20 may weight for on-coming traffic in lane 30S to clear and then will complete the turn 48.

Figure 4:
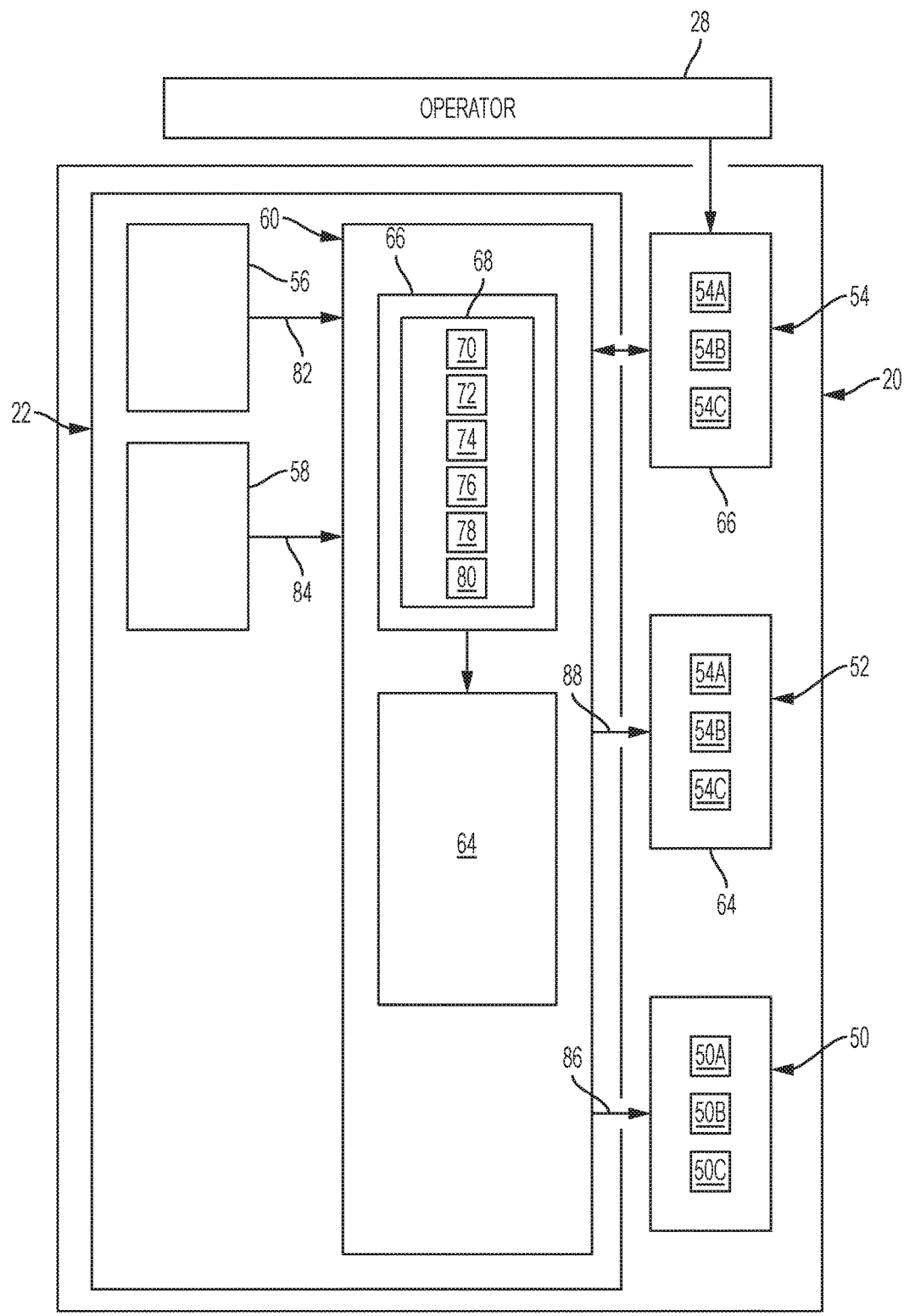
FIG. 4 is a schematic of the automated vehicle with the traffic blocking avoidance system.

Referring to FIG. 4, in the example of a semi-autonomous vehicle 20, the host vehicle may be generally operated by the driver or operator 28 with assistance provided by the traffic blocking avoidance system 22. In the application example of a fully autonomous vehicle, the host vehicle 20 may not require a driver and may seat only passenger(s). The host vehicle 20 may include the traffic blocking avoidance system 22, a warning unit 50, a control override unit 52, and a manual control unit 54. If the host vehicle 20 is a semi-autonomous vehicle, the operator assistance provided by the tracking system 22 may be the mere activation of the warning unit 50, or may include activating the control override unit 52 that may temporarily take over the control of the manual control unit 54. The manual control unit 54 may include a directional device 54A (e.g., steering mechanism), an acceleration device 54B, and a braking device 54C of the host vehicle 20. The warning unit 50 may include, or may be, an audible device 50A, a visual device 5OB, and/or a haptic device 5OC.

The traffic blocking avoidance system 22 may include an object detection device 56 that may include at least one detector, an intersection locator device 58, and a controller 60. The object detection device 56 may be mounted to and toward the front of the host vehicle 20, and may be any number of a Light Detection And Ranging (LiDAR) device, an imaging device (e.g., camera and/or video), a radar device, and others used to detect various objects including other vehicles. The intersection locator device 58 may be adapted to locate the intersection 24 and/or boundary lines 62 (see FIG. 1) of the intersection with respect to the host vehicle 20. In one embodiment, the intersection locator device 58 may be, or may be part of, a Global Positioning Device (GPS). In another embodiment, the intersection locator device 58 may be part of the object detection device 56 that may be configured to detect stationary objects, or landmarks, associated with the intersection. In yet other embodiments, the intersection locator device 58 may include information, or data, stored by the controller 60, and/or may be configured to receive a locator signal from a dedicated intersection beacon.

The controller 60 may include a processor 64 and an electronic storage medium 66. The processor 64 may be a microprocessor or other control circuitry such as analog and/or digital control circuitry including an application specific integrated circuit (ASIC) for processing data as is known by one with skill in the art. The storage medium 66 of the controller 60 may be non-volatile memory, such as electrically erasable programmable read-only memory (EEPROM) for storing one or more routines, thresholds, and captured data, hereafter referred to as an application 68 (e.g., a computer software product).

The application 68 may be executed by the processor 64 of the controller 60 to prevent an occurrence of the host vehicle 20 from blocking the intersection 24 by at least recognizing the location of the host vehicle 20 with respect to the intersection 24, the location/speed/direction of oncoming and leading vehicles, and which roadway 26A, 26B has the right-of-way. The application 68 may include a direction intent module 70, a right-of-way module 72, an object monitoring module 74, a location module 76, a determination module 78, and an information file or database 80. The direction intent module 70 is configured to determine, or note, the intended direction of travel (i.e., straight, left, or right) of the host vehicle 20 through the intersection 24.

The right-of-way module 72 may be configured to determine, or note, which lanes 30N, 30S, 30W, 30E have the right-of-way, and/or are directed to yield, in any given moment in time. In one embodiment, the right-of way module 72 may receive a signal 82 from the object detection device 56 indicative of a sensed light color (i.e., red or green) from the traffic light 32 to determine right-of-way. In another embodiment, the right-of-way module 72 may receive a wireless signal transmitted from, for example, the traffic light 32. The right-of-way determination includes the right-of-way associated with the host vehicle 20.

The object monitoring module 74 may be configured to receive the signal 82 from the object detection device 56 that may include information relative to any objects within a field of view of the object detection device 56. In one embodiment, the object monitoring module 74 may be configured to recognize specific objects including other vehicles, the location of the vehicles with respect to the intersection 24, the lanes, and/or the host vehicle 20, the speed of the vehicles, and the direction of travel of the vehicles.

The location module 76 may be configured to receive a signal 84 from the intersection locator device 58, and indicative of intersection location data, to determine the location of the host vehicle 20 with respect to the location of the intersection 24 and/or boundaries 62. In another embodiment, the signal 84 may be the delivery of information (i.e., the intersection location data) from the database 80 stored in the electronic storage medium 66 that may be indicative of intersection location and/or coordinates.

The determination module 78 may apply data processed and/or received by the modules 70, 72, 74, 76 and database 80 to determine when the host vehicle 20 should enter the intersection 24 and while the host vehicle 20 has the right-of-way. The determination module 78 may therefore generate a reaction of the host vehicle 20 upon a determined moment in time. More specifically and in a semi-autonomous application, the determination module 78 may send a command signal 86 to the warning unit 50 as the vehicle reaction to alert the driver 28 not to enter the intersection 24 even though the operator has the right-of-way. In an autonomous application, the determination module 80 may send a command signal 88 to the braking device 54C causing the host vehicle 20 to remain stopped until the leading vehicle 34 has cleared the intersection by distance 46 (see FIG. 2).

In operation of the traffic blocking avoidance system 22, and as one, non-limiting, scenario, the intersection locator device 58 may detect, and/or otherwise recognize, an approaching intersection 24 with associated boundaries 62, and output a signal 84 to the location module 76. The location module 76 may generally locate the host vehicle 20 with respect to the intersection 24 and/or boundaries 62. The object detection device 58 may detect and recognize a leading vehicle 34 and the distance between the leading vehicle 34 and the host vehicle 20.

In one example, the vehicles 20, 34 may be stopped before the intersection 24 in lane 30N with the intent to drive North bound. The intent of the host vehicle 20 to drive straight through the intersection 24 is noted by the direction intent module 70. Upon a change from "red" to a "green" signal from the traffic light 32, the object detection device 56 outputs a signal 82 to the right-of-way module 72 that notes the present right-of-way permission for the host vehicle 20. At about the same time, the leading vehicle 34 may begin moving through the intersection 24 while the host vehicle 20 may not enter the intersection 24 (i.e., remains behind boundary 62).

The system 22 operates to keep the host vehicle 20 behind boundary 62, by the object detection device 56 outputting a signal 82, indicative of an increasing distance 90 (see FIG. 1) between the host vehicle 20 and the leading vehicle 34, which is received and processed by the object monitoring module 74. The object monitoring module 74 may communicate with the determination module 78 configured to compare the distance 90 to a threshold distance 92 (see FIG. 2) that may generally equal a width 94 of the intersection 24 plus the distance 46 that may represent the length of the host vehicle 20 (see FIG. 2). The threshold distance 92 may be part of the database 80 stored in the electronic storage medium 66. For the duration that the distance 90 is less than the threshold distance 92, the system 22 may prevent the host vehicle 20 from entering the intersection 24 even though the host vehicle 20 has the right-of-way signal from the traffic light 32.

Preventing the host vehicle 20 from entering the intersection 24 may be effected by a command signal 88 outputted to the vehicle control unit 54, or control override unit 52, from the determination module 78. The command signal 88 may control the acceleration device 54B and the braking device 54C causing the host vehicle 20 to approach the boundary 62 as the leading vehicle 34 initially departs, but not yet allowing the host vehicle 20 to enter the intersection 24.

When the determination module 78 determines that the distance 90 is about equal to or greater than the threshold distance 92, and the host vehicle 20 still has the right-of-way (i.e., as detected by the object detection device 56 and processed by the right-of-way module 72), the determination module 78 may output a command signal 88 to the control module 54, or control override unit 52, causing the host vehicle 20 to enter and move through the intersection 24. If the host vehicle 20 no longer has the right-of-way, the command signal 88 sent to the control unit will prevent the host vehicle from entering the intersection 24 until the next "green" signal is received from the traffic light 32. In this way, the host vehicle 20 is prevented from blocking the intersection 24.

As generally described, the traffic blocking avoidance system 22 may be a distance-based approach. However, in one embodiment, the distance-based approach may be selectively applied to avoid creating traffic jams that may be causing by the host vehicle 20 waiting for the leading vehicle to clear out of the way. That is, the distance-based approach is only used when necessary by predicting the future speeds and the locations of the leading and host vehicles. That is, the traffic blocking avoidance system 22 may first predict condition(s) before applying the distance-based approach.

Accordingly, the system 22 for automated operation of the host vehicle 20 advances the automated vehicle arts by enabling a system, application, or controller to determine when a host vehicle should move through an intersection 24 while minimizing any chance that the host vehicle could block traffic due to unexpected operation of leading vehicle(s).

The various functions described above may be implemented or supported by a computer program that is formed from computer readable program codes, and that is embodied in a computer readable medium. Computer readable program codes may include source codes, object codes, executable codes, and others. Computer readable mediums may be any type of media capable of being accessed by a computer, and may include Read Only Memory (ROM), Random Access Memory (RAM), a hard disk drive, a compact disc (CD), a digital video disc (DVD), or other forms.

Terms used herein such as component, application, module, system, and the like are intended to refer to a computer-related entity, either hardware, a combination of hardware and software, or software execution. By way of example, an application may be, but is not limited to, a process running on a processor, a processor, an object, an executable, a thread of execution, a program, and/or a computer. It is understood that an application running on a server and the server, may be a component. One or more applications may reside within a process and/or thread of execution and an application may be localized on one computer and/or distributed between two or more computers While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to

Having thus described the invention, it is claimed:

1. A system for semi-autonomous or autonomous operation of a host vehicle comprising:
   at least one object detector configured to output a vehicle signal indicative of a location of a leading vehicle; and
   a controller of the host vehicle configured to receive the vehicle signal and associate the vehicle signal relative to intersection location data to prevent the host vehicle from entering a roadway intersection until the leading vehicle has at least traveled beyond the roadway intersection.

2. The system set forth in claim 1, further comprising:
   an intersection locator device configured to output a signal to the controller indicative of intersection location data for the roadway intersection.

3. The system set forth in claim 1, wherein the at least one detector includes a LiDAR detector.

4. The system set forth in claim 1, wherein the at least one detector includes an imaging device.

5. The system set forth in claim 1, wherein the at least one detector includes a radar detector.

6. The system set forth in claim 2, wherein the intersection locator device includes a Global Positioning System (GPS).

7. The system set forth in claim 2, wherein the controller includes a processor and an electronic storage medium, and the intersection location data is stored in the electronic storage medium and retrieved by the processor for associating the intersection location data to the vehicle signal.

8. The system set forth in claim 1, wherein the leading vehicle has traveled beyond the roadway intersection by a distance at least equal to a length of the host vehicle before the host vehicle enters the intersection.

9. The system set forth in claim 7, wherein the leading vehicle has traveled beyond the roadway intersection by a distance at least equal to a length of the host vehicle before the host vehicle enters the intersection, and the distance is preprogrammed into the electronic storage medium.

10. The system set forth in claim 1, wherein the at least one detector is configured to detect an intersection traffic control device adapted to transmit a right-of-way permission and a yield directive, and the controller is configured to prevent the host vehicle from entering the roadway intersection during the right-of-way permission and when the leading vehicle remains within the roadway intersection.

11. The system set forth in claim 10, wherein the intersection control device is a traffic light.

12. An automated vehicle comprising:
    a traffic blocking avoidance system including an object detection device configured to detect a leading vehicle and monitor a distance measured between the leading vehicle and the automated vehicle, and output a signal indicative of the distance, and a controller configured to recognize an intersection, locate the intersection with respect to the automated vehicle, receive the signal, compare the distance to a threshold distance, output a first command signal if the distance is less than the threshold distance, and output a second command signal if the distance is greater than the threshold distance; and
    a control unit adapted to receive the first command signal thereby preventing the automated vehicle from entering the intersection, and receive the second command signal thereby causing the automated vehicle to enter the intersection.

13. The automated vehicle set forth in claim 12, wherein the controller includes a processor and an electronic storage medium and the threshold distance is stored in the electronic storage medium.

14. The automated vehicle set forth in claim 13, wherein the threshold distance is equal to or greater than a width of the intersection.

15. The automated vehicle set forth in claim 13, wherein the processor recognizes the intersection, at least in-part, via information stored in electronic storage medium.

16. The automated vehicle set forth in claim 13, wherein the processor is configured to recognize a right-of-way permission and the automated vehicle is prevented from entering the intersection when the distance is less than the threshold distance and when the automated vehicle has the right-of-way permission.

17. A computer software product executed by a processor and stored in an electronic storage medium of a host vehicle, and configured to prevent the host vehicle from blocking traffic when entering a roadway intersection, the computer software product comprising:
    an object monitoring module configured to receive a signal from an object detection device of the host vehicle to determine a distance between a leading vehicle and the host vehicle;
    a location module configured to determine a location of the roadway intersection relative to the host vehicle; and
    a determination module configured to use the distance and the location of the roadway intersection relative to the host vehicle to prevent the host vehicle from entering the roadway intersection if the leading vehicle has not cleared the roadway intersection.

18. The computer software product set forth in claim 17, wherein:
    a right-of-way module configured to determine when the host vehicle has a right-of-way permission and when the host vehicle has a yield directive, wherein the determination module is configured to prevent the host vehicle from entering the roadway intersection if the leading vehicle has not cleared the roadway intersection and when the host vehicle has the right-of-way permission.

19. The computer software product set forth in claim 18, wherein the determination module is configured to output a command signal to a control unit of the host vehicle to effectuate whether the host vehicle enters or does not enter the roadway intersection.

* * * * *